Patented Dec. 11, 1951

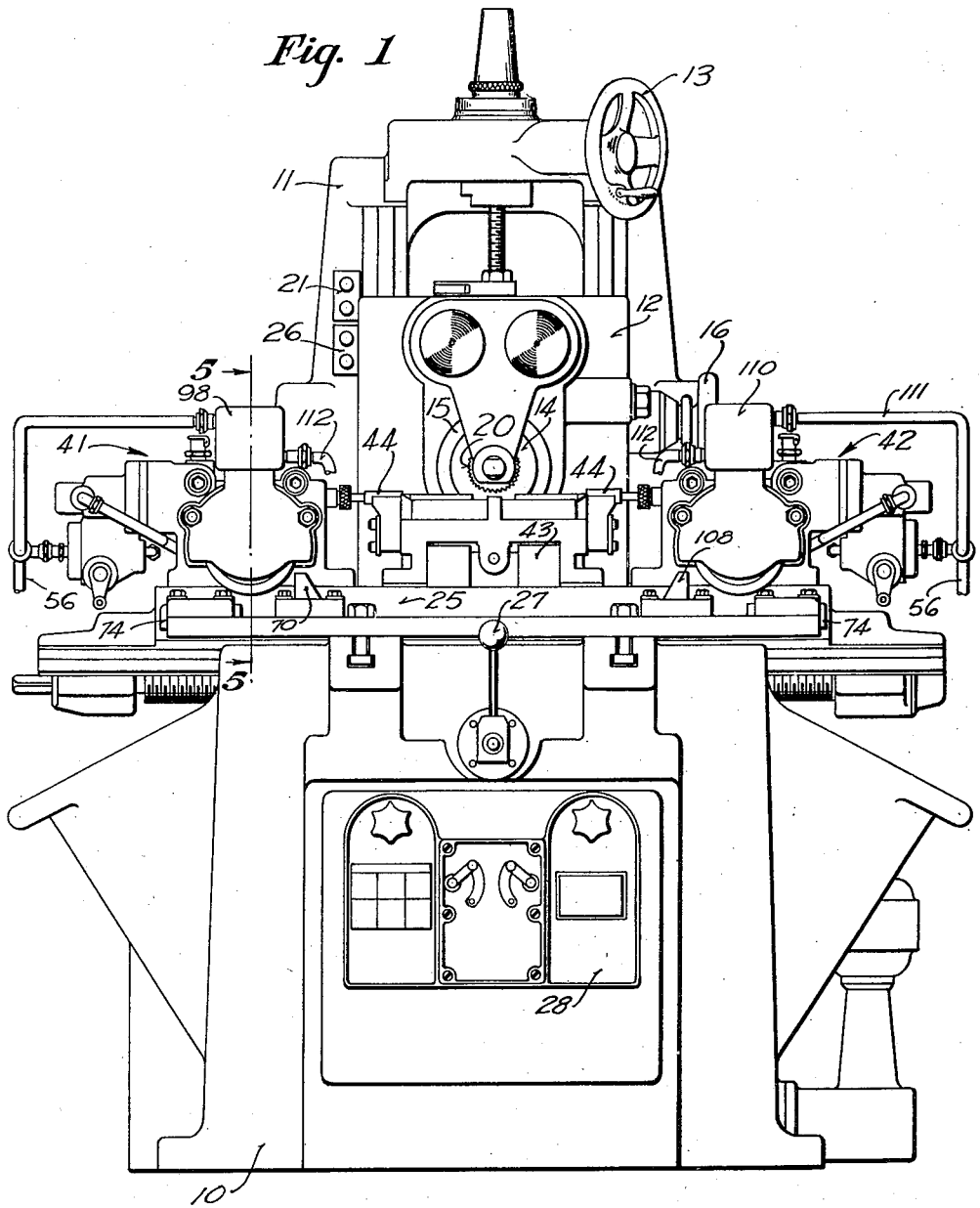

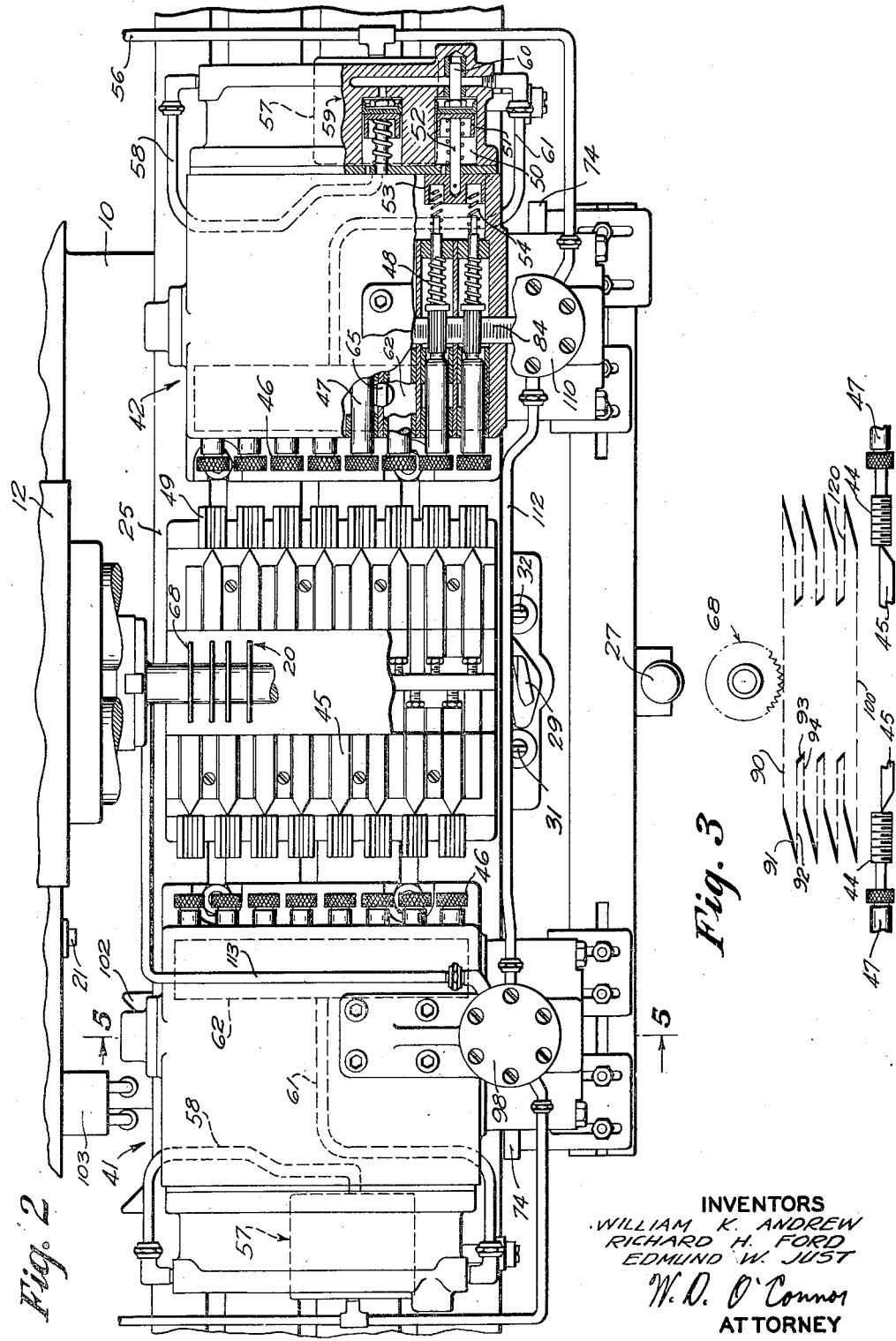

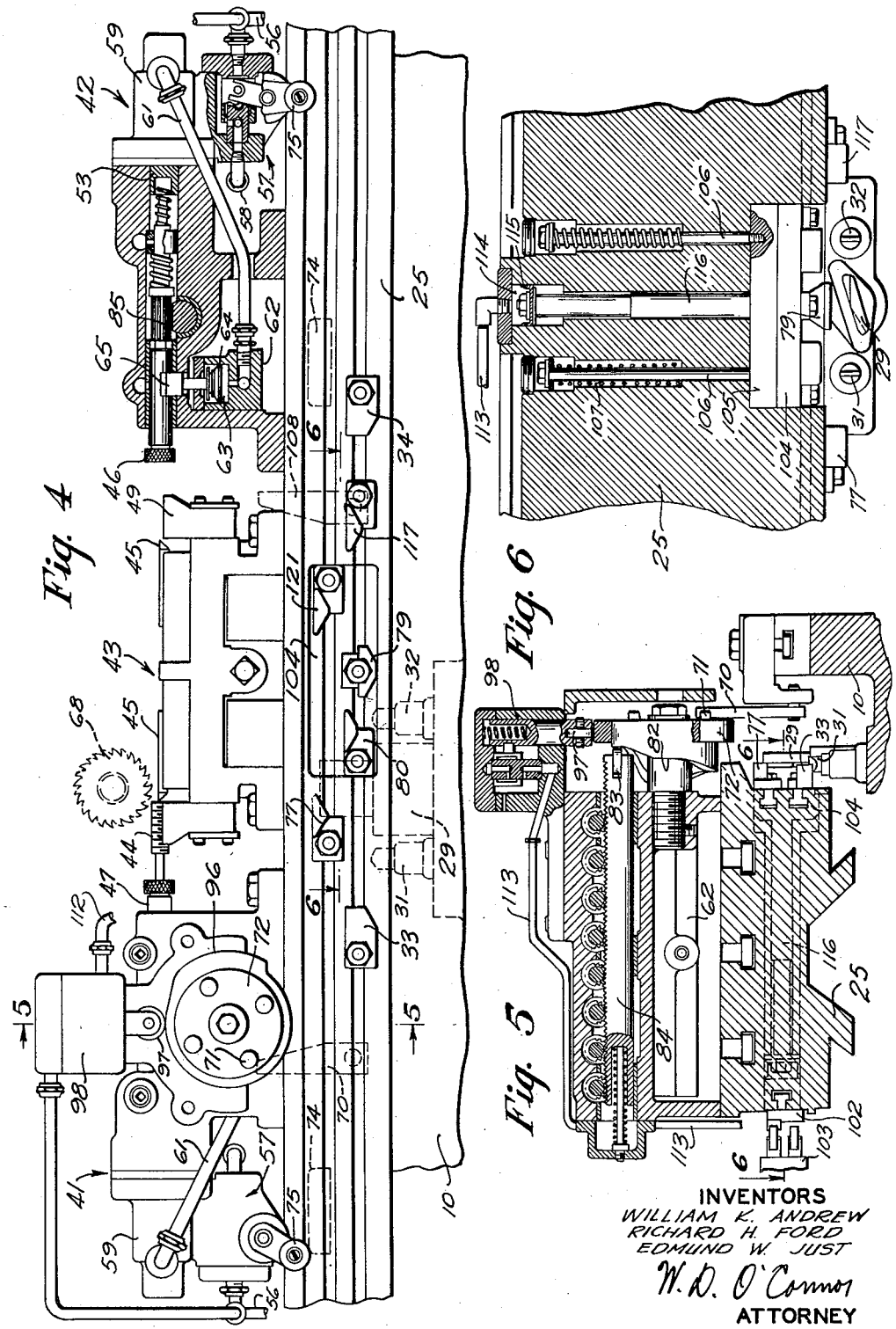

2,577,943

UNITED STATES PATENT OFFICE 2,577,943

MACHINE TOOL ORGANIZATION AND CONTROL MECHANISM

William K. Andrew, Wauwatosa, Richard H. Ford, Waukesha, and Edmund W. Just, West Allis, Wis., assignors to Kearney & Trecker Corporation, West Allis, Wis., a corporation of Wisconsin Application January 10, 1945, Serial No. 572,162

9 Claims. (Cl. 90—21)

This invention relates generally to machine tools and more particularly to an improved automatic milling machine of the type adapted to operate in a continuous cycle.

A general object of the invention is to provide an improved milling machine arranged to effect successive series of machining operations automatically.

Another object of the invention is to provide a milling machine having a plurality of indexing work holders, together with a control system arranged to effect a series of feeding and indexing movements with respect to one work holder, followed automatically by a similar series of feeding and indexing movements with respect to another work holder.

Another object of the invention is to provide an improved actuating and controlling mechanism for an automatic milling machine.

Another object is to provide an automatic machine tool in which a reciprocating carriage is arranged to operate alternately through two series of feeding and rapid traverse movements.

Still another object of the invention is to provide a fully automatic multiple work fixture for a machine tool.

Another object is to provide an improved control system for a power actuated machine tool carriage arranged to actuate the carriage automatically in a series of strokes of differing lengths.

Another object is to provide an improved machine tool having movement controlling trip mechanism so arranged that selected tripping elements may be rendered ineffective during operation of the machine to vary the characteristics of the operating cycle.

Another object is to provide a machine tool with tripping mechanism including a trip dog arranged to be retracted selectively for varying the tripping action.

Another object is to provide an improved control system for effecting automatic indexing, clamping and traversing actions in a machine tool.

A further object is to provide an automatic work retaining fixture operably disposed to effect positioning of a plurality of workpieces and alternate indexing and locking of the workpieces during a series of automatic cutting operations thereon.

A still further object is to provide a multiple work fixture wherein a series of work retaining spindles are automatically indexed by action of a single indexing plunger.

According to this invention, an automatic milling machine is arranged to effect a continuous succession of series of indexing and feeding actions with respect to a plurality of workpieces. For this purpose, the machine is provided with a multiple indexing fixture at each end of the table, the control system being so arranged that each fixture, in turn, is fed to a cutter gang repeatedly with intervening indexing actions to effect a series of machining cuts on the workpieces. At the end of a series of minor cycles with respect to one fixture, the table is traversed automatically to bring up the other fixture, which is then fed to the cutter gang repeatedly in the same manner, the major cycle being repeated continuously. A fluid pressure control system effects the successive actions in response to tripping mechanism, the transition from minor cutting strokes to the major traversing stroke being effected by retracting an intermediate reversing trip dog.

The foregoing and other objects of this invention, which will become more readily discernible from the following detailed description, when read in conjunction with the accompanying drawing, may be achieved by means of the particular illustrative apparatus there shown in the several views, of which:

Figure 1 is a general view in front elevation of a milling machine fitted with apparatus embodying the principles of the present invention;

Fig. 2 is an enlarged fragmentary plan view of the cooperating work and cutter supporting structures of the machine shown in Fig. 1, with parts broken away to better disclose the actuating mechanism;

Fig. 3 is a schematic diagram of the continuous reciprocating operating cycle of the machine;

Fig. 4 is an enlarged fragmentary view in front elevation of the work supporting structure shown in Fig. 1, with parts broken away and with the cutters and trip mechanism shown in phantom;

Fig. 5 is a view in vertical transverse section through the table and the left work holding fixture, taken on the plane represented by the lines 5—5 in Figs. 1, 2 and 4; and, Fig. 6 is a fragmentary view in horizontal transverse section through the table, taken on the plane represented by the lines 6—6 in Figs. 4 and 5 and showing the retractile trip dog carrier.

The particular machine tool shown in the drawing, as exemplifying a practical supporting structure fitted with apparatus embodying the principles of the present invention is a milling machine of the bed type, generally similar in form to the machine disclosed and claimed in copending application, Serial No. 431,908, filed February 23, 1942, now Patent No. 2,407,913, dated September 17, 1946 with certain changes in the driving mechanism, the present machine being fitted with a separate motor for actuating the table. However, it is to be understood that apparatus embodying the invention may be utilized with any of various other machines.

Referring more specifically to the drawing, and particularly to Fig. 1, the milling machine there shown comprises essentially a hollow bed or base 10 that constitutes the supporting frame of the machine and forms a housing for much of the actuating mechanism. At the rear of the machine, the base 10 supports an upstanding column structure 11 fitted with a spindle carrying head 12, that is vertically adjustable by means of a hand wheel 13 at the top of the column. The spindle head 12 carries a horizontally disposed cutter driving spindle 14 mounted in a quill 15 that is longitudinally adjustable in the head by means of a hand wheel 16 projecting at the right side of the column, as is usual in milling machines of this type. The spindle 14 is fitted with a suitable gang of cutters 20 and is arranged to be driven by the usual motor (not shown) mounted in the bed 10 and electrically connected to be started or stopped by a push button controller 21 mounted on the left side of the column 11.

In front of the column 11, a work carrying table 25 is slidably mounted on the upper surface of the bed 10 for longitudinal reciprocating movement in the usual manner in cooperating relationship with the cutters 20. Power movement of the table is effected by a separate motor (not shown) mounted in the base 10 and electrically connected to be controlled by a push button controller 26 mounted on the column 11 adjacent to the controller 21. Longitudinal movement of the table 25 by power from the motor may be caused to occur in either direction at either feed or rapid traverse rate through manual actuation of a controlling lever 27 on the front of the bed 10. Movement of the lever 27 to the right or to the left effects movement of the table in the corresponding direction. Tilting movement of the lever outward or away from the table provides for movement at rapid traverse rate while tilting of the lever inward or toward the table provides for movement at feed rate, the rate of feeding movement being established by selective adjustment of pickoff rate changing gearing mounted within the bed 10 and made accessible by opening a hinged door 28.

Control of the rate and direction of movement of the table 25 may also be effected automatically in various cycles through the operation of trip mechanism fully described in the previously mentioned copending application and including a central unit constituted by a vertically movable rate changing tripping post 29 flanked on each side by reversing plungers 31 and 32, as shown in Figs. 2 and 6. The tripping post 29 is arranged in the usual manner to effect movement at rapid traverse rate when in its upper position and at feed rate when in its lower position.

The reversing trip plungers 31 and 32 are adapted to be engaged by reversing trip dogs mounted in the usual manner on the front edge of the table 25, such as the dogs 33 and 34, shown in Fig. 4, which serve to delimit the terminal positions and to effect reversal at the extreme end of travel of the table in either direction. As more fully explained in the previously mentioned patent, the reversing plungers operate, when depressed, to effect both reversal in direction of movement and change to rapid traverse rate of movement, whereby the table may be caused to return at rapid traverse rate after reversal. Ordinarily, the table is fitted with stop dogs arranged in conjunction with the reversing dogs and operative upon the tripping post 29 to stop the table in the event of failure of the automatic reversing mechanism. However, this safety feature has been omitted from the drawing to simplify the illustration.

As shown in Figs. 1, 2 and 4, the table 25 is provided at its opposite ends with opposed work holding indexing fixtures or heads 41 and 42 that cooperate with a central tailstock structure 43 to support a plurality of workpieces 44 at opposite sides of the cutter gang 20 for alternative engagement with the cutters.

In operating in accordance with this invention, one of the indexing heads is fed to the cutters 20 by a series of approaching and feeding strokes with intervening retracting and indexing movements for effecting the desired number of cutting actions upon the workpieces, there being a plurality of similar workpieces 44 in each fixture. At the completion of the cutting operations on one set of workpieces, the machine functions automatically to withdraw and unclamp the finished workpieces while advancing the other indexing head to effect a similar series of cutting operations upon the workpieces held by it.

The feeding and indexing of the workpieces occurs alternately in a series of strokes or minor cycles through the action of the automatic trip mechanism until the required number of milling cuts has been effected. The table 25 is then automatically reversed through a major stroke to withdraw the finished workpieces from the region of the cutter gang 20 and bring the new workpieces in the other fixture into cooperating relationship with the cutters. The new workpieces are then fed to the cutters, retracted, indexed, and then fed to the cutters again, the process being repeated as many times as necessary to complete the required number of cuts. In the meantime, the operator has removed the finished workpieces from the first fixture and replaced them with new pieces so that, after the last cut is taken, the table again traverses through its major stroke to complete a major cycle, the process being repeated continuously, as indicated diagrammatically in Fig. 3.

The particular workpiece 44, shown in the drawing is a thread cutting tap and the operation to be performed the milling of four longitudinal flutes in equally spaced relationship. As shown in Fig. 2, each fixture is arranged to receive eight taps, each tap being supported at its entering end by a center 45 carried by the tailstock unit 43. At their other or squared driving ends, the taps are engaged by suitable chucks 46 on the ends of work holding plungers or spindles 47, rotatably and slidably mounted in the headstocks 41 and 42, as best shown in Figs. 2 and 4. Each plunger 47 is provided with a spring 48 that urges it into engagement with the associated tap 44, each tap being supported in alignment with its respective plunger and tailstock center by means of a V-block 49. For clamping the taps tightly between centers, each pair of plungers 47 has associated with it a fluid pressure cylinder 50 provided with a cooperating piston 51, the piston being connected by a rod 52 with a cross head 53, which operates upon both plungers through interposed compression springs 54.

After the taps have been placed in the V-blocks 49 in loading the fixture, fluid pressure from a source represented by an inlet pipe 56 is admitted through a clamping valve 57 and a connecting pipe 58 into one end of a manifold 59 formed in the body of the fixture and connected with each of the cylinders 50, the pressure forcing the plungers 47 forward into engagement with the taps. At the other end of the manifold 59, there is a valve member 60, which is connected with the associated piston 51 and arranged to open when the plungers move to a clamping position, thereby admitting pressure into a conduit 61. As best shown in Fig. 4, the conduit 61 communicates with a manifold 62 that connects with a series of vertical cylinders 63. Each cylinder 63 is located beneath one pair of the plungers 47 and is provided with a piston 64 carrying a clamping shoe 65, the arrangement being such that, when pressure is admitted to the manifold 63, the pistons 64 are forced upward to engage the clamping shoes with a wedging action between the adjacent plungers 47 of each pair.

Although the fluid pressure system could be actuated hydraulically, it is, in this instance, arranged to be operated pneumatically by pressure, such as is available in the usual shop air line.

As best shown in Fig. 2, the two fixtures 41 and 42 and their cooperating tailstock centers 45 are arranged in staggered relationship, in such manner that each workpiece is aligned with an independent cutter 68 of the cutter gang 20. By this arrangement, every other cutter is positioned to cooperate with a workpiece in the fixture 41, while the intermediate cutters cooperate with workpieces in the fixture 42. With the table in the position shown in Figs. 2 and 4, the clamping valve 57 associated with the right fixture 42 is closed, hence no pressure is exerted upon the work retaining plungers, the plungers being in released condition for receiving workpieces.

With the left fixture 41 loaded with workpieces 44 as indicated in Fig. 4, the machine may be put into operation by starting the table in movement to the right at rapid traverse rate through the manual actuation of the control lever 27 outwardly and rightwardly to cause the lefthand fixture 41 to approach the cutter gang 20. As the table moves to the right, an indexing dog 70, mounted on the front of the bed 10, engages one of four indexing pins 71 on an indexing plate 72 rotatably mounted on the side of the head 41 to effect rotation of the plate through approximately 90°. Immediately following the indexing movement, a clamping dog 74 on the bed engages and pivots an actuating arm 75 of the clamping valve 57 associated with the head 41, thereby actuating the valve and effecting rigid clamping of the workpieces in the manner previously explained in connection with the head 42, the mechanisms of the two heads being substantially identical.

By the time the clamping action has occurred, the workpieces 44 will have been advanced almost to the respective cutters 68. At this position, a feed dog 77 on the front of the table 25 engages the tripping post 29 and moves it downwardly to the feed rate position, whereupon the table advances at feed rate to feed the workpieces into the rotating cutters 68. The feeding action continues until the first flute is cut to the desired length, at which time the left terminal reversing dog 33 engages the left reversing plunger 31, thereby reversing the direction and rate of movement of the table for effecting a return stroke at rapid traverse rate, as previously explained.

As the table moves to the left, the actuating arm 75 of the clamping valve 57 moves out of engagement with the clamping dog 74, thereby effecting a closure of the valve and a consequent release of the clamping action upon the work holding plungers 47. The indexing dog 70 is of the pivoted type and, upon movement to the left with the table 25 is deflected through its pivotal action by the pins 71 of the indexing plate 72, without imparting motion to the plate. After the indexing dog 70 clears the indexing plate 72, the return stroke of the table is terminated through action of a centrally located intermediate reversing dog 79, which has associated with it a feed dog 89 that depresses the trip plunger 29 to cause the table to move at feed rate as the reversing dog 79 moves into engagement with the reversing trip plunger 32. This completes a minor cycle and causes the table 25 to again advance to the right at rapid traverse rate to effect a second cut in the workpieces.

As the table advances to the right in a second minor stroke for the second cut, the indexing dog 70 again engages one of the indexing pins 71 of the indexing cam plate 72 to turn it through a quarter turn. As best shown in Fig. 5, the cam plate 72 is provided on its inner surface with a cam track 82, which cooperates with a follower roller 83 on an indexing rack bar 84 disposed transversely of the head beneath the work holding plungers 47. As appears in Figs. 2, 4, and 5, each of the plungers 47 is provided with gear teeth constituting a relatively long pinion 85 that has meshing and sliding engagement with rack teeth on the indexing bar 84.

As shown, the cam surface 82 presents a series of lobes or dwells corresponding in number to the number of cuts required in the workpieces—in this instance, four. The rack bar 84 is biased toward the cam surface 82 by a spring in a manner to hold the follower roller 83 against the cam, the arrangement being such that as the cam is turned through each quarter turn, the rack 84 is moved a sufficient distance to turn the work holding plungers 47 simultaneously through 90°, thereby properly indexing all eight of the taps 44 for sequentially machining the four equally spaced flutes. Immediately following the indexing movement, the actuating arm 75 of the clamping valve 57 engages the clamping dog 74 to open the valve and effect clamping of the plungers 47 in the indexed position. The feed dog 77 then engages the tripping post 29, as before, to change the rate of travel from rapid traverse rate to feed rate for cutting the second flute.

The relative movements of the cutter and the workpieces in the two heads are shown diagrammatically in Fig. 3, the lines representing the strokes of travel constituting a full major cycle, with the horizontal dotted portions indicating movement at rapid traverse rate and the inclined solid portions indicating movement at feed rate. During the approach movement from the starting position, the cutter gang 20, which may be represented by the cutter 68 indicated above the cycle diagram, and the left workpieces 44, shown below the diagram, have relative approaching movement at rapid traverse rate, as indicated by the horizontal dotted line 90, while the indexing and clamping operations are being effected. When the feed rate dog engages the tripping post, the relative movement continues in the same direction at feed rate, as indicated by the sloping full line 91, to cut the first flute. Following reversal at the end of the first cutting stroke, the relative movement occurs at rapid traverse rate in the return stroke, as indicated by the horizontal dotted line 92, to complete a minor cycle. At the end of the return stroke, the movement occurs at feed rate for the short distance indicated by the inclined line 93, whereupon reversal occurs and relative movement to bring the cutter and work back into engaging position is effected, as before, at rapid traverse rate indicated by the horizontal dotted line 94.

Repetition of the minor cycle continues in this manner through as many feeding and return strokes as are necessary to effect the required number of cuts upon the workpieces, the number, in this instance, being four.

As the workpiece and cutter are caused to approach for the final cut of the series of minor cycles, the indexing dog 70 turns the indexing cam plate 72 to its final position, thereby moving the indexing bar 84 to its extreme inner position for indexing the workpieces for the last fluting cut. Coincidentally, a cam lobe 96 on the periphery of the cam disk 72 engages a follower roller 97 associated with a control valve 98, which functions to change the mode of operation of the tripping mechanism to cause it to effect a major stroke for withdrawing the finished workpieces in the left fixture 41 and advancing the workpieces held in the right fixture 42 toward the cutter gang 20. This is accomplished by retracting the central reversing dog 79 and its associated feed dogs from cooperating relationship with the tripping unit, whereby the rapid traverse return movement from the cutting of the final flute is permitted to continue as indicated by the horizontal dotted line 100 on the diagram in Fig. 3, through a full stroke of movement. When the table 25 moves to retract the fixture 41 and bring up the fixture 42, the actuating arm 75 of the clamping valve 57 on the fixture 41 moves out of engagement with the clamping dog 74, thereby unclamping the finished workpieces in the fixture 41 to release them for removal. As the table continues its movement, a dog mechanism 102 on the back of the table engages and actuates a reversing switch 103, which functions to reverse the spindle driving motor, thereby causing it to drive the cutter gang 20 in the proper direction for engaging the appropriately positioned cutters 68 with the workpieces 44 in the right hand fixture 42.

As best shown in Fig. 6, the retractile center or intermediate reversing dog 79 and its associated feed dogs are carried by a trip dog carrier 104, which is slidably mounted within a socket 105 disposed in the front face of the table 25. When the dog carrier 104 is in an operative position, it is flush with the front edge of the table, thereby supporting its reversing and feed dogs in line with those secured directly to the table, as may be seen with reference to Fig. 4. To provide for the traversing or end-to-end movement of the table in a major stroke, the trip dog carrier 104 may be retracted into the socket 105 in the front face of the table, as shown in Fig. 6, to withdraw the reversing dog 79 in a manner to permit the dog to clear the reversing plungers 31 and 32 of the tripping unit without engaging them. As shown, the trip dog carrier 104 has secured thereto a pair of spaced guide rods 106, each of which is fitted with a compression spring 107 arranged to bias the dog carrier 104 to its retracted position. As the traversing movement of the table 25 continues past the point at which the retracted central reversing dog 79 would otherwise operate, as indicated by the horizontal dotted line 100 in the diagram (Fig. 3), another indexing dog 108, generally similar to, but reversed from the dog 70, engages one of the pins 71 of the indexing plate 72 carried by the right fixture 42. This indexing plate corresponds to the plate 72 of the fixture 41 and, as rotated, effects an indexing movement of the workpieces in the fixture 42 in the manner previously explained in connection with the fixture 41. As the plate 72 turns, it withdraws a cam lobe, similar to the cam lobe 96, from beneath the actuating plunger of a valve 110, which is generally similar to the valve 98 of the fixture 41. This permits the valve 110 to open and admit fluid pressure from the source 56 through a conduit 111, the valve 110 and a conduit 112, which leads to the valve 98. In the valve 98, the conduit 112 is permanently connected with a conduit 113 (Fig. 5), which leads from the valve 98 to the rear of the table 25. As shown in Fig. 6, the conduit 113 connects with a cylinder 114 integrally formed in the rear edge of the table and fitted with a piston 115 having a rod 116 connected to the dog carrier 104. When the valve 110 is opened upon rotation of the indexing cam plate, pressure is admitted through conduits 112 and 113 to the cylinder 114 and acts upon the piston 115 therein to move the dog carrier 104 forward into active position in opposition to the compression springs 107. With the dog carrier 104 in the operative or active position, the central reversing dog 79 is again in position to effect reversal in the minor cycle of table operation.

Further movement of the table to the left causes the clamping dog 74 adjacent to the right end of the machine to engage the actuating arm 75 of the valve 57, thereby opening the valve and admitting pressure to clamp the workpieces in the fixture 42. Following the clamping action, a feed dog 117 engages the control post 29, moving it downward to feed position for effecting the feeding action for cutting the first flute. At the end of the first cut, the reverse dog 34 engages the reverse plunger 32, thereby causing reversal at rapid traverse rate, as indicated on the diagram (Fig. 3) by a horizontal dotted line 120 to complete the first minor cycle with respect to the right fixture 42.

Since the dog carrier 104 is now in the active position, a trip dog 121 on the carrier 104 engages the trip post 29 to shift it to the feed position as the intermediate reversing dog 79 moves into engagement with the reverse tripping post 31 at the end of the first minor cycle.

The table, in moving to the left in the next minor stroke, then effects the indexing, clamping and fluting operations, as previously described, the minor cycles being repeated until all of the flutes are cut. Upon the last indexing movement, the cam lobe 96 of the cam plate 72 closes the valve 110, thus cutting off pressure to the cylinder 114 and permitting the springs 107 to retract the dog carrier 104. Hence, when reversal occurs at the end of the last cutting stroke, the intermediate reversing dog 79 will pass the trip plunger unit and permit a full stroke movement of the table rightwardly to complete the major cycle.

Since the valve 98, associated with the left fixture 41, was closed by the last indexing movement of that fixture, continued movement of the table to the right in the major stroke serves to open the valve upon the first indexing movement effected by the left indexing dog 70 because the cam lobe 96 will be turned out from under the follower roller 97. Thus, pneumatic pressure is admitted from the source 56 through the valve 98 and the conduit 113 to the cylinder 114 for repositioning the dog carrier 104 in active position, to effect the succeeding minor indexing cycles.

Although the particular apparatus shown is arranged for machining four flutes in each of the workpieces, it will be readily understood that the mechanism may be adapted to effect any required number of successive machining actions by providing appropriately shaped cams and making various other adjustments. Furthermore, the control mechanism is shown as being actuated pneumatically, but it is obvious that it may be adapted for operation hydraulically, mechanically or electrically.

From the foregoing detailed description and explanation of operation of the illustrated exemplifying apparatus herein set forth as a practical embodiment of the present invention, it will appear that there has been provided an improved machine tool actuating and control mechanism that is especially adapted for performing automatically continuous cycles of reciprocation of a machine member in a new and improved manner.

Although the illustrative embodiment of the invention has been described in detail for the purpose of fully disclosing a practical structure incorporating the invention, it is to be understood that the particular apparatus herein set forth is intended to be illustrative only and that the novel characteristics of the invention may be incorporated in various other structural forms without departing from the spirit and scope of the invention, as defined in the following claims.

The principles of the invention having now been fully explained in connection with the foregoing description of the embodying apparatus, we hereby claim as our invention:

1. In a machine tool having a reciprocating table, power actuating and controlling mechanism for effecting automatic reciprocating movements of said table, a pair of reversing trip dogs carried by said table at positions defining terminal points in the path of movement of said table and arranged to operate upon said power actuating and controlling mechanism to effect reciprocation of said table between said terminal points, another reversing trip dog movably mounted on said reciprocating table at a position interposed between said terminal trip dogs and operative when moved to active position to effect a shorter reciprocating movement of said table, and means operative while said table is in motion to move said interposed reversing dog to inactive position selectively, whereby the length of the stroke of movement of said table may be changed during operation of the machine.

2. In a milling machine, a base, a power actuated movable work supporting table mounted on said base, trip mechanism mounted on said base and operative to control power movements of said table including movable trip means for actuating said mechanism, a plurality of trip dogs carried by said table in the path of said trip means to engage and move said trip means for actuating said mechanism, and power operated means carried by said table and arranged to retract one of said dogs selectively from cooperating position, whereby the controlling effect of said trip mechanism and cooperating dogs may be varied while said machine is in operation.

3. In a milling machine having a base and a power actuated work supporting table movably mounted on said base, trip mechanism mounted on said base and operative to control power movements of said table in a variable reciprocal operating cycle including movable trip means for actuating said mechanism, a trip dog movably mounted on said table in a manner to engage and actuate said trip mechanism, and power actuated means carried by said table and arranged to move said dog into or out of cooperating relationship with said trip mechanism selectively.

4. In a milling machine having a power actuated work supporting table, a plurality of trip dogs carried by said table for movement therewith in a path of tripping action, tripping mechanism arranged to be actuated by said dogs in moving along said path and operative to control power movements of said table, a retractile trip dog carried by said table, and fluid pressure operated mechanism carried by said table and connected to actuate said retractile trip dog for moving it into or out of said path of tripping action selectively.

5. In a machine tool having a base and a power actuated carriage movably mounted on said base, tripping mechanism mounted on said base and operative to control power movements of said carriage including movable trip means for actuating said mechanism, a retractile trip dog mounted on said carriage in the path of said trip means in a manner to engage and actuate said trip mechanism, and power actuating means mounted on said carriage and arranged to move said trip dog into or out of position in cooperating with said tripping means.

6. In a machine tool having a power actuated carriage, tripping mechanism operative to control power movements of said carriage, a retractile trip dog mounted on said carriage, and fluid pressure actuated means mounted on said carriage and arranged to position said trip dog into or out of cooperating relationship with said tripping mechanism selectively.

7. In a milling machine, a frame, a milling cutter rotatably mounted in said frame, a work supporting table movably mounted on said frame in cooperating relationship with said cutter, a source of power operatively connected to move said table in either direction selectively, a pair of reversing trip dogs fixed in spaced relationship on said table, tripping mechanism including a tripping unit extending from said frame between said trip dogs and operative upon engagement by either of said dogs to effect reversal in the direction of movement of said table, a movably mounted reversing trip dog carried by said table between said spaced trip dogs and likewise operative upon engagement with said tripping unit to effect reversal, and selectively operative means actuated by movement of said table to move said movably mounted trip dog out of cooperative relationship with said tripping unit, whereby said table may be caused to reciprocate through a stroke delimited by said fixed trip dogs or through either of two shorter strokes delimited by said movable trip dog and one or the other of said fixed trip dogs, depending upon the position of said movable trip dog relative to said tripping unit.

8. In a milling machine, a frame, a cutter rotatably supported by said frame, a work supporting table slidably mounted on said frame in cooperating relationship with said cutter, power operated means arranged to effect reciprocating movement of said table, trip mechanism operative to control movement of said table, a pair of reversing trip dogs mounted in spaced relationship upon said table and operative upon said trip mechanism in manner to effect reversal of movement of said table at predetermined terminal positions, another reversing trip dog movably mounted on said table between said first-mentioned trip dogs and arranged to cooperate therewith for effecting reversal of movement of said table to provide for reciprocation thereof in either of two cycles of movement, and means to move said intermediate trip dog out of cooperating relationship with said trip mechanism to permit movement of said table from the one to the other terminal position, whereby it may be caused to operate in either of said two cycles of movement selectively 9. In a machine tool, a frame, a carriage movably mounted on said frame, power actuated mechanism in said frame operatively connected to drive said carriage, control mechanism in said frame arranged to control said power actuated carriage driving mechanism, trip dogs adjustably mounted on said carriage, tripping mechanism on said frame arranged to be actuated by said trip dogs during movement of said carriage and operative to actuate said control mechanism, a dog supporting element movably mounted on said carriage, trip dogs adjustably mounted on said movably mounted dog supporting element, and control means arranged to move said dog supporting element on said carriage to position the dogs thereon in actuating or non-actuating positions selectively relative to said tripping mechanism, whereby the cycle of operations effected by said trip dogs may be varied through control of the position of said movable dog supporting element.

WILLIAM K. ANDREW.
RICHARD H. FORD.
EDMUND W. JUST.

REFERENCES CITED

The following references are of record in the file of this patent:

UNITED STATES PATENTS

| Number | Name | Date |
|---|---|---|
| 1,866,348 | Ferris | July 5, 1932 |
| 1,938,770 | Archea | Dec. 12, 1933 |
| 2,121,923 | Neubert | June 28, 1938 |
| 2,155,864 | Krause | Apr. 25, 1939 |
| 2,169,484 | Armitage | Aug. 15, 1939 |
| 2,190,858 | Bennett | Feb. 20, 1940 |
| 2,261,052 | Coffin et al. | Oct. 28, 1941 |
| 2,350,975 | Rodder et al. | June 6, 1944 |

FOREIGN PATENTS

| Number | Country | Date |
|---|---|---|
| 118,971 | Great Britain | Sept. 19, 1918 |